May 21, 1963    D. A. R. MORRISON    3,090,472
DRIVE MECHANISM FOR WASHING MACHINE
Filed June 27, 1961    3 Sheets-Sheet 1

INVENTOR.
DONALD A. R. MORRISON
BY
ATTORNEY

*INVENTOR.*
DONALD A. R. MORRISON
BY
*ATTORNEY*

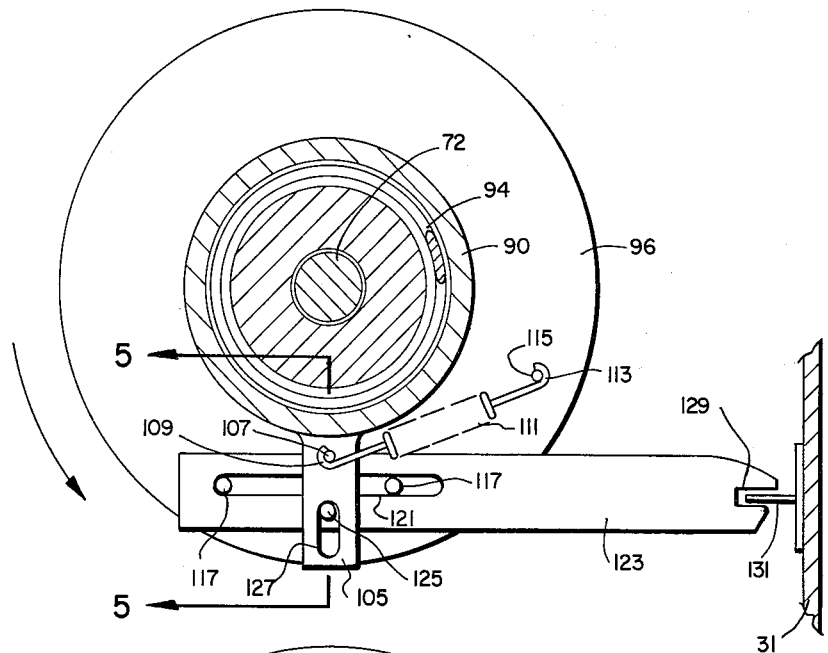
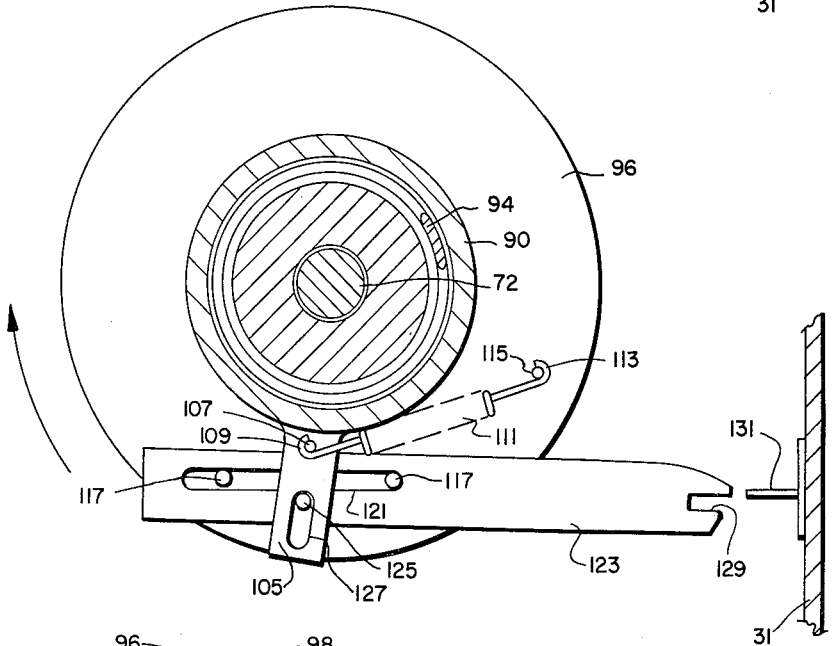
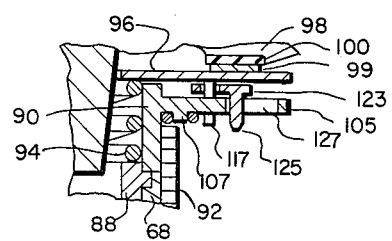

United States Patent Office 3,090,472
Patented May 21, 1963

3,090,472
DRIVE MECHANISM FOR WASHING MACHINE
Donald A. R. Morrison, Glen Ellyn, Ill., assignor to General Electric Company, a corporation of New York
Filed June 27, 1961, Ser. No. 119,887
5 Claims. (Cl. 192—12)

The present invention relates to washing machines and more particularly to drive mechanisms for the same.

It is an object of the invention to provide a new and improved clutching and braking device for use in washing machine power transmission mechanisms.

It is a further object of the invention to provide in a drive mechanism for a laundry machine, a constant torque clutching arrangement, with improved means for maintaining a braking action on the rotating basket during agitation and for braking the tub for speedy deceleration at the conclusion of the spin operation.

It is a still further object of the invention to provide a simple, efficient latching linkage for a clothes washing machine transmission mechanism which is controlled by the motion of a clutch plate to determine its active period.

In order to effectuate these objects, the present invention provides an improved drive mechanism for a washing machine. The mechanism is driven by a reversible motor, which rotates in one direction to agitate the center post agitator shaft and in the opposite direction to spin the tub. About a lower coaxial drive shaft there are positioned two oppositely formed spring clutches, one to effectuate the agitate action and the other the spin action. For agitation, the agitate spring clutch rotates the drive shaft which in turn drives a gear transmission linked to oscillate the agitator shaft.

For spin, the spin clutch spring tightens about a clutch hub and couples this hub to a disc-shaped clutch plate. The clutch plate is biased axially and on being rotated transmits its driving force through a ring of friction material to an axially adjacent section of the transmission housing. The housing is driveably connected to the spin tub so that rotation of the housing serves to rotate the tub. The amount of torque transmitted by the disc clutch to the housing is of course limited by the axial pressure exerted on the clutch plate. Thus during the acceleration of the transmission housing and the spin tub, the torque delivered to the clutch can be limited by allowing the clutch to slip if the torque generated by the motor is greater than can be transmitted by the clutch. This torque limiting action eliminates the danger of motor stalling on acceleration.

To provide a braking action there is linked to the clutch plate an outwardly extending latch arm which is coupled to spin freely with the clutch plate. However, when the disc clutch slows down as it does at the termination of spin, a bias spring applies greater force to the arm than the lessening driving force and the latch arm slides into engaging relationship with a stationary stop member to thereby brake the transmission housing and the spin tub. This latching or brake action is maintained during the agitate cycle due to the spring bias and the quiescence of the clutch plate occasioned by the direction of rotation of the drive motor. In this way, the clutch plate, transmission housing and spin tub are locked during all operations of the machine except spin.

The invention both as to its organization and principle together with further objects and advantages thereof, will best be understood by reference to the following specification taken in conjunction with the accompanying drawings in which:

FIG. 3 is a sectional view of the transmission clutch plate viewed along the lines 3—3 of FIG. 2 and with the clutch plate locked;

FIG. 4 is a sectional view of the transmission clutch plate as FIG. 3 with the clutch plate freed for rotation; and FIG. 5 is a partial section viewed along the lines 5—5 of FIG. 3.

Figure 1:
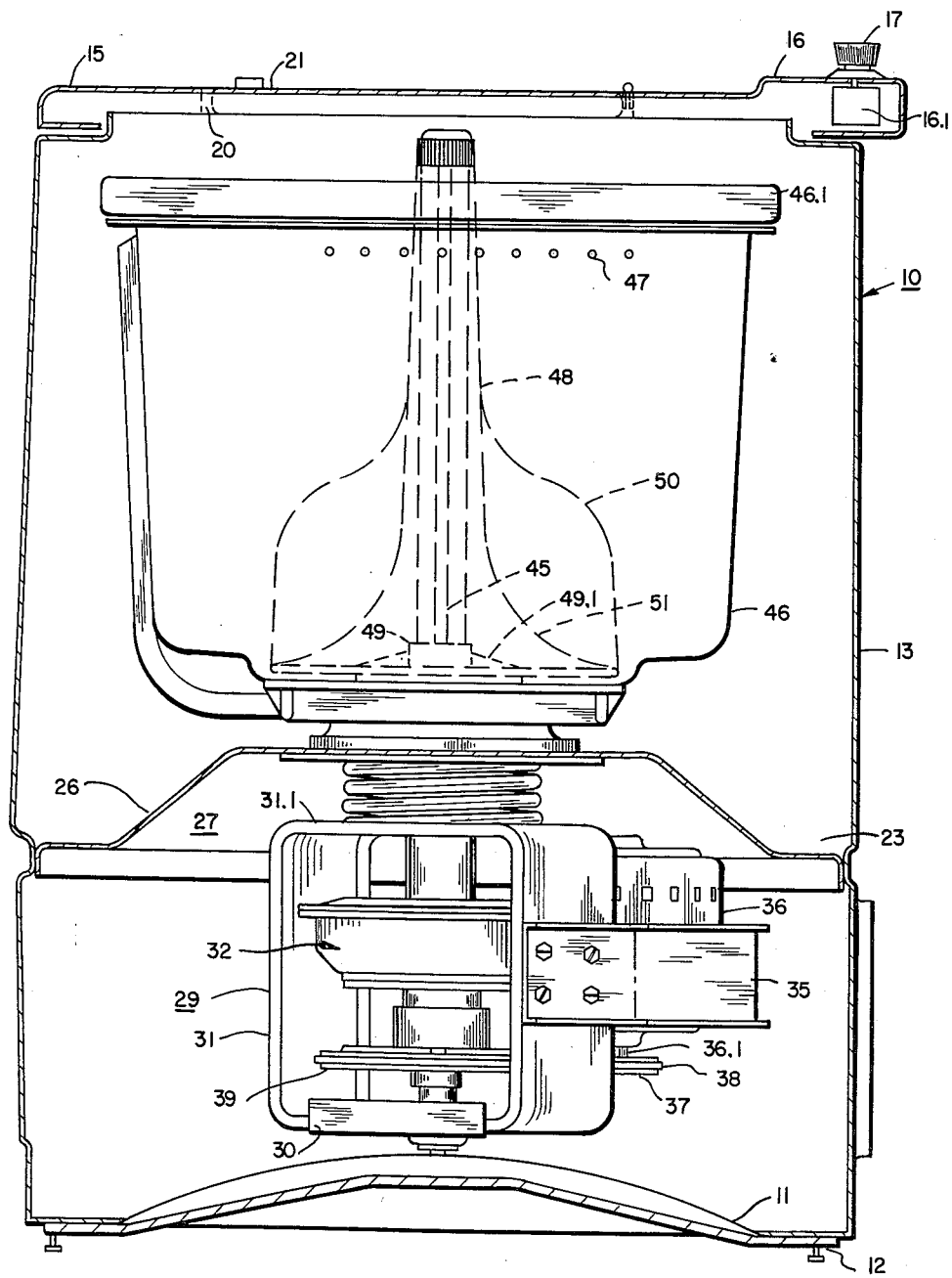
FIG. 1 is a partially sectioned side elevational view of a washing machine employing my invention.

Referring now to FIG. 1 of the drawings, the clothes washing machine 10 there illustrated, is of the generally known spin tub type. More particularly, the machine 10 comprises a substantially rectangular base 11 that is supported upon independently adjustable feet 12 arranged to engage the floor or other supporting surface. An enclosing housing or outer casing 13 is removably carried by the base 11 and includes a conventional wrap around element including front, side and top walls. The sides of the top wall 15 are substantially flush with the side walls of housing 13 to form an upright substantially rectangular prism. At the rear of the top wall 15 is mounted vertically offset backsplasher 16 which serves as a control panel. The inner portion of this backsplasher contains the control mechanisms and switches (shown only as rectangle 16.1) for initiating a cycle of the proper length and type. Purely by way of simplified example, there is shown a timer control knob 17 which is rotatable manually to set the desired length of the operative cycle.

A substantially centrally disposed top opening 20 is provided in top wall 15 in order to render the interior of the housing 13 accessible. A conventional lid 21 is provided for the purposes of selectively closing the top opening 20; the lid being hinged to top wall 15 at its rear edge and movable thereabout from a closed position to an open position allowing access to the interior of the casing 13 for loading or unloading the machine.

A generally rectangular collection chamber 23 is provided in the upper portion of housing 13. The bottom wall 26 of chamber 23 is welded or otherwise suitably sealed to the inner wall of the housing, and spaced above base 11 to define a machinery compartment 27 arranged in the lower portion of housing 13. Within this compartment there is provided a support structure 29 which serves as the foundation for the transmission and this support is mounted to base 11. This support structure 29 comprises a horizontal base plate 30, vertical side walls 31 extending therefrom to and joining a top plate 31.1 in forming an open rectangular mounting space for the transmission mechanism 32. Secured to one side wall 31 is a curved channel member 35 to which is bolted or affixed in any known manner the main drive motor 36. Motor 36 is positioned in inverted fashion with its output shaft 36.1 depending from the motor structure. Secured about the motor shaft is a coupling to a drain pump (not shown) of any generally known type. The pump may preferredly have its impeller fastened to the motor shaft so that the pump may expel waste water on rotation of the motor. Further, the motor shaft has mounted to it a pulley 37 which carries a flexible V belt 38. This V belt is also laced about pulley 39 of the transmission mechanism 32, to impart driving effect thereto. The transmission mechanism 32 is mounted in parallel relationship to the motor 36 and has extending upwardly above its topmost surface a central agitator shaft 45 which in its upward extent protrudes through the bearing retainer structure and into the collection chamber 23.

An upstanding spin tub or basket 46 is centrally positioned within collection chamber 23 and is mounted for rotation about a substantially vertical axis. The spin tub is generally imperforate and has an open face adjacent the top access opening of the casing 13 to allow access to the tub interior. About the periphery of the basket adjacent the open face, there is secured an annular balance ring 46.1 of high density material providing a comparatively large moment of inertia for the tub. The spin tub 46 is provided with an upwardly and outwardly flared sidewall that terminates, as mentioned, below the access opening. Near its upper periphery tub 46 contains a horizontally aligned series of apertures or slots 47 for centrifugally ejecting water from the tub. At the center of the spin tub there is positioned a vertical agitator 48 which is mounted coaxially on the agitator shaft 45 and is oscillated thereby. Also mounted coaxially about the agitator shaft is a tubular spinner shaft 49 whose upper end terminates a few inches above the spin tub lower surface. This spinner shaft is used to impart rotative motion to the spin tub and to further this end, the spin shaft is firmly secured to the spin tub 46 at hub 49.1. The lower end of spin shaft 49 is mounted securely to the upper surface of transmission housing 32 so that the spin shaft and spin tub are co-rotative with the transmission housing 32. Exteriorly of the cylindrical body of the agitator 48 are positioned a plurality of radially extending agitator vanes 50. The agitator is further provided with an outwardly and downwardly flared skirt 51 to which the vanes 50 are joined at their lower ends.

Turning more specifically to the drive mechanisms which form the core of the present invention, there is provided as previously mentioned, a main drive motor 36. The motor comprises a reversible induction motor of the split-phase type which may be of the two-speed type, but for simplicity will be described herein as a single-speed motor. The motor, a typical appliance motor, has a rating of about 1/3 horsepower and an operating speed at full load of about 1,725 r.p.m. The motor, in generally known fashion, may be energized through selectable circuitry for rotation in the clockwise or counterclockwise direction to effectuate the necessary agitate and spin operations.

Figure 2:
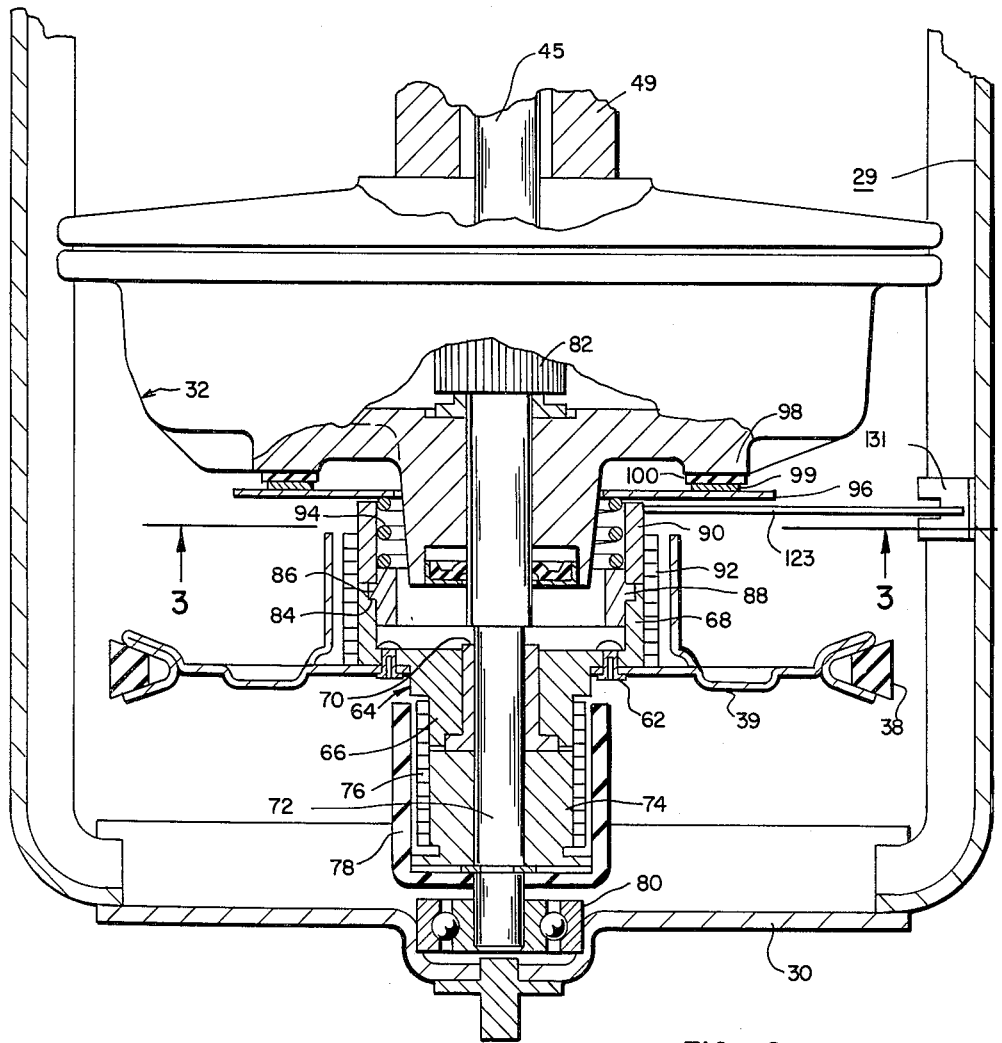
FIG. 2 is a side elevational section of the transmission mechanism.

Turning now to FIG. 2, there is shown in detail the driving mechanism of the invention. As can be seen, transmission support 29 serves as a frame about the transmission housing 32. Within the support, there is extended from the motor pulley, V belt 38 which fits driveably within the sheave of pulley 39. Pulley 39 is secured by suitable means such as rivets or screws 62 to a driving hub 64 so that rotation of the pulley serves to rotate hub 64. As will be described more fully, hub 64 and its allied bearing 70 may rotate idly on or with its bearings, or may serve to drive shaft 72. The hub 64 includes a lower cylindrical section 66 and an upper cylindrical section 68 disposed vertically and coaxially to one another. Lower hub section 66 rests on a shoulder portion of bearing 70. Below bearing 70 and coaxial therewith is the shaft driving base member 74, the outer diameter of which is equal to that of lower hub section 66 and which is positioned directly below this lower section. Member 74 is secured to shaft 72 by a key or the like (not shown). Arranged radially outwardly of lower section 66 and base member 74 is a one-way clutch spring 76. Clutch spring 76 comprises a length of spring formed into a cylindrical shape fitting snugly about hub section 66 and base member 74 to form a clutching member of the familiar type which when rotated in one direction tightens about the members inwardly of it and when rotated in the opposite direction spins substantially freely thereabout. Such clutch springs and their operation are well known in the art. In the type shown in U.S. Patent 2,751,773 issued to T. T. Woodson on June 26, 1956, for example, the spring clutch is made even more positive in action by means of an extending tab which enters an aperture in one of the hub members, but this is not essential if the spring normally fits snugly upon the respective hubs. This clutch spring is the means by which the shaft 72 may be driven or not. Protective members such as grease seal 78 are disposed about the spring clutch and agitator shaft to prevent dripping of grease onto the lower shaft bearing 80.

From this description it can be seen that when pulley 39 is rotated in one direction, which is assumed to be counterclockwise, hub 64 is rotated in a counterclockwise direction. Rotation of the hub and its lower section 66 causes clutch spring 76 to tighten up on said lower section 66 and on base member 74, in turn rotating the member 74 and consequently shaft 72. Shaft 72 on rotation serves to rotate gear 82 which through any conventional gear train (not shown) will agitate shaft 45 in a known manner. Such a mechanism for translating rotary to oscillatory motion may be similar in principle to the one shown in the said Woodson patent.

The upper end of upper hub section 68 is formed with a continuous notch 84, rectangular in cross-section, which serves to vertically position a matching emboss 86 of a tubular bushing 88. This bushing also serves to hold above the emboss a driven clutch hub 90, whose outer diameter is substantially identical to that of upper section 68 so that a second one-way spring clutch 92 may cylindrically surround and contact both upper hub section 68 and clutch hub 90. Spring 92 is wound in a direction opposite to that of spring 76 so that when pulley 39 is rotated in the direction in which spring 76 tightens, spring clutch 92 overruns. Conversely, when spring 92 tightens, spring 76 will run freely. For ease of assembly hub 90 and bushing 88 may be press-fitted together to serve a second purpose in maintaining above the assembly a helical compression spring 94 which maintains a compressive force against annular clutch plate 96 to force the clutch plate into contact with annular emboss 98 on the lower surface of the outer casing of the transmission 32. Actually, clutch plate 96 has adhered or otherwise suitably secured to its upper surface an annular resilient ring 99 which may be rubber, and secured to the top surface of this ring is a second similarly sized ring 100 of friction material indigenous to the brake lining art. It is this latter ring 100 which actually contacts the depending emboss 98, the details of which will be explained more fully.

FIGS. 3–5 show the interrelation of the clutch hub 90 and the clutch plate 96 to obtain both the spin clutching engagement and also the spin tub braking feature. In FIG. 3, there can be seen the radially extending arm 105 which is integral with or at least fixed to upper clutch hub 90. From this arm there depends a pin 107 which serves as a mount for one hook end 109 of a helical tension spring 111. The other hook end 113 of the tension spring is secured about pin 115, which also depends from clutch plate 96; spring 111 thereby serves to bias hub arm 105 relative to the clutch plate. Clutch plate 96 further has a pair of spaced, aligned pins 117. These pins are spaced angularly concentrically on the annular clutch plate 96. These pins fit within an elongated slot 121 in horizontally extending latch arm 123. The extent of the slot 121 with respect to pins 117 is such that with one pin at the end of the slot, the other pin is maintained a predetermined distance from the other slot end. Further there is a pin 125 which depends from latch arm 123 through a mating slot 127 defined in the hub arm 105. Pin 125 is sized relatively to slot 127 to allow considerable movement of the pin along the slot length. In this manner a spring biased linkage is constructed which is responsive to the rotative direction of machine drive motor as will be explained more fully.

To complete the detailed description, the outer tip of latch arm 123 is notched with a notch or groove 129 which is designed to mate with a stop member or finger 131 extending horizontally inwardly from a sidewall 31 of transmission support 29. As shown in FIG. 3, the notch 129 is maintained in an at rest condition latched to member 131 in a position which can best be described as the tub braking position or the position assumed by the mechanism during the machine agitate cycle.

In operation, the machine starts into its cycle in which the tub is filled with wash water in a conventional manner and then the machine enters its agitate cycle. For the agitate cycle, the motor rotates in the direction which rotates pulley 39 in the counterclockwise direction (the direction viewed from below as seen in FIGS. 3 and 4). Hub 64 (FIG. 2) rotates with the pulley, causing clutch spring 76 to tighten up about base member 74 which, as previously mentioned, is keyed to shaft 72. Shaft 72 will thereby rotate driving pinion 82 and the agitate gear train (not shown). As a result, agitate shaft 45 will oscillate the agitator 48 within the basket.

With rotation of the clutch hub 64 in the agitate direction, upper clutch spring 92 spins substantially freely about upper hub section 68 and the upper hub 90. Usually the clutch plate 96 will be locked, as will be explained more fully, and as a result upper hub 90 will not rotate.

In machines which utilize unidirectional spring clutch arrangements, rotation in the non-power-transmitting direction will impart a slight rotative creep force through the spring clutch. Thus, if the clutch hub arm 123 is not latched at the start of rotation of the drive pulley in the agitate direction, arm 105 will move slightly in the counterclockwise direction. This motion will tend to drive arm 123 to the right aided by the bias of spring 111. By this movement, arm 123 will continue to creep until notch 129 engages stationary finger 131. Engagement of this notch and finger will restrain further sympathetic motion of upper hub 90 and clutch plate 96. As a result of this engagement, no torque of any kind will be transmitted from clutch plate 96 to the transmission housing 32. Maintenance of the transmission housing in a stationary condition insures that no rotative force is transmitted to the spin shaft or spin tub. The spin tub itself remains quiescent during the agitation cycle with agitation being carried on inside the tub.

At the end of the timed agitate period, drive motor 36 is stopped. The motor is then accelerated in the reverse direction to initiate the centrifuging operation. (This rotation drives the assembly of FIGS. 3 and 4 in the clockwise direction.) Rotation of the motor is transmitted from pulley 37, through belt 38 to driven pulley 39 to clutch hub 64. About the lower section 66 of the hub, spring 76 will not tighten and as a result vertical shaft 72 is not rotated. Thus no agitation can occur.

With rotation of the clutch hub in this direction, upper spring clutch 92 tightens about the upper clutch hub section 68. This action causes the spring to also tighten about upper hub 90 rotatively coupling the clutch hub 64 to hub 90 in the clockwise direction. Hub 90 on rotation draws its extending arm 105 against the bias imposed by spring 111. Thus motion is transmitted from hub 90 and arm 105 through pin 125 to latch arm 123 which is thereby drawn to the left as viewed in FIG. 4. Latch arm 123 slides to the left and its slot 121 forces pins 117 into the position shown in FIG. 4. The driving force is thereby imparted to clutch plate 96 which then rotates with the upper hub 90. From FIG. 5, it can be seen that clutch plate 96 has its annulus 99 pressed into contact with friction band 100 by the compressive force of spring 94. Thus, when clutch plate 96 rotates, this rotary motion is transmitted to the emboss 98 on housing 32 and the housing begins to rotate. The housing on rotation will rotate the spin shaft 49 anchored thereto and in turn will rotate the spin basket 46. Rotation of the basket centrifuges the wash liquid through holes 47 and out of the machine in a generally known fashion.

The clutching arrangement explained herein is of the type referred to as a "constant torque clutch." The use of this term is derived from the manner of engagement of friction ring 100 with the adjacent transmission casing emboss 98. This engagement is maintained axially of the circular clutch plate and is not dependent on the centrifugal characteristics of the clutch. The torque transmitted by the clutch will react as the formula $$T = f \times N \times R$$

where $T$=torque; $f$=friction coefficient of the engagement of the ring 100 to emboss 98; $N$ is the normal force acting on the clutch plate, and $R$ is the mean radius of the rubbing surfaces. The friction coefficient and the mean radius remain relatively constant for the materials involved as they remain substantially unchanged. Thus, the transmitted torque is a direct function of the normal force against the clutch plate, this being determined by the force applied by compression spring 94. As a result of this construction, if clutch plate 96 receives an amount of torque greater than the maximum allowable under the setting of spring 94, then this added torque will merely be dissipated by spinning of the clutch plate relative to the transmission casing. As a result, the maximum torque transmitted to the casing and spin tub is maintained at a predetermined value. The purpose of this limitation of transmitted torque is that of insuring that the motor is not overloaded during periods where a great amount of torque is needed, i.e., acceleration of the spin basket.

At the conclusion of spin, the drive motor is deenergized and pulley 39 will rotate only due to the inertia of the rotating members in the system. No further torque is transmitted through the spring clutch 92. With the removal of the force driving the driven clutch hub 90 in the clockwise direction, the restoring force of spring 111 draws hub arm 105 to the right. Latch arm 123 is moved to the right by the interlinkage of slots and pins. Movement of latch arm 123 to the right engages notch 129 with stationary finger 131 and further rotation of clutch plate 96 is ended. The clutch friction band as it remains in contact with transmission casing emboss 98 acts as a brake against further rotation of the casing and spin basket. The spin basket is quickly brought to a halt due to this braking action and will remain in this braked or locked condition until the start of the next spin cycle.

The mechanism herein described therefore serves as a torque limiting clutch mechanism, a brake inhibiting sympathetic spin of the basket during agitation, and as a brake which stops the inertial rotation of the spin basket quite rapidly after deenergization of the drive motor in the spin direction.

While there has been described what is at present thought to be a preferred embodiment of the invention, it will be understood that it is intended to cover in the appended claims all modifications which fall within the true spirit and scope of the invention.

What is claimed is:

1. In a washing machine having a tub within which clothes are washed and centrifugally dried, combination tub driving and braking means, including:
   structure fixed to said tub for supporting the same for rotation about an axis;
   an annular clutch plate concentric with said tub axis;
   spring means arranged to exert a predetermined, substantially uniform axial effort on said clutch plate for urging said clutch plate into frictional driving engagement with said supporting structure;
   a driving member concentric with said axis of rotation;
   a hub concentric with said clutch plate and rotatable relative thereto;
   a clutch mechanism mounted on said driving member for rotating said hub, said mechanism being of the direction responsive type to transmit minimum rotational effort to said hub in one direction of rotation and maximum rotational effort thereto in the other direction of rotation;
   a first drive arm extending radially from said hub in parallel spaced relation to said clutch plate;
   a second drive arm extending from said clutch plate;
   means providing a driving connection between said plate and said second arm while permitting movement of said arm relative thereto;
   means providing a driving connection between said first and second arms;
   a stop member fixed relative to said second arm, said arm having means to engage said stop member to preclude rotation of said clutch plate;

spring means for urging said second arm laterally into engagement with said stop member;

and a motor for rotating said driving means optionally in said one or the other direction;

the mechanical relationship between said first and second drive arms being such that the limited rotational effort of said clutch mechanism on said hub cooperates with said spring means to maintain said second arm and said stop member in engagement to prevent rotation of said clutch plate, and the said maximum rotational effort in the other direction of rotation opposes said spring means to effect retraction of said second drive arm from said stop member to free said clutch plate for rotation.

2. The tub driving and braking means according to claim 1, in which the driving connection between said clutch plate and said second drive arm comprises a pin and slot connection, in which a pair of pins is arranged along a chord of said clutch plate.

3. The tub driving and braking means according to claim 1, in which said second drive arm is mounted on said clutch plate for longitudinal movement along a chord thereof, and the driving connection between said first and second drive arms includes means permitting angular displacement of said first drive arm while effecting longitudinal movement of said second drive arm.

4. The tub driving and braking means according to claim 1, in which said spring means is connected respectively to said clutch plate and said first drive arm.

5. The driving and braking means according to claim 1, in which said clutch plate spring means comprises a coil spring disposed internally of said hub, said spring being supported relative to said clutch plate by structure including said driving member.

References Cited in the file of this patent

UNITED STATES PATENTS

| | | |
|---|---|---|
| 2,270,283 | Ewald | Jan. 20, 1942 |
| 2,346,158 | Dyer | Apr. 11, 1944 |
| 2,699,683 | Castner | Jan. 18, 1955 |
| 2,946,409 | Jennings | July 26, 1960 |